(12) United States Patent
Vollmer et al.

(10) Patent No.: US 11,997,940 B2
(45) Date of Patent: Jun. 4, 2024

(54) SYSTEMS, METHODS, AND APPARATUS FOR CROP INPUT VARIETY SELECTION

(71) Applicant: Precision Planting LLC, Tremont, IL (US)

(72) Inventors: Justin Vollmer, Morton, IL (US); Luke Stuber, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 617 days.

(21) Appl. No.: 17/298,476

(22) PCT Filed: Oct. 4, 2019

(86) PCT No.: PCT/IB2019/058458
§ 371 (c)(1),
(2) Date: May 28, 2021

(87) PCT Pub. No.: WO2020/109881
PCT Pub. Date: Jun. 4, 2020

(65) Prior Publication Data
US 2022/0022364 A1    Jan. 27, 2022

Related U.S. Application Data

(60) Provisional application No. 62/772,170, filed on Nov. 28, 2018.

(51) Int. Cl.
*A01C 7/04* (2006.01)
*A01C 7/10* (2006.01)
*A01C 15/00* (2006.01)

(52) U.S. Cl.
CPC .............. *A01C 7/044* (2013.01); *A01C 7/102* (2013.01); *A01C 15/006* (2013.01)

(58) Field of Classification Search
CPC ....... A01C 7/044; A01C 7/102; A01C 15/006; A01C 7/042; A01C 7/04; A01C 7/00; A01C 7/10; A01C 7/08; A01C 15/005; A01C 15/00
See application file for complete search history.

(56) References Cited

U.S. PATENT DOCUMENTS

| 5,915,313 A | 6/1999 | Bender et al. |
| 2014/0165891 A1 | 6/2014 | Garner et al. |
| 2018/0148276 A1 | 5/2018 | Stuber et al. |

OTHER PUBLICATIONS

European Patent Office, International Search Report prepared for International Application No. PCT/IB2019/058458, mail date Nov. 25, 2019.

*Primary Examiner* — Christopher J. Novosad

(57) ABSTRACT

Systems, methods, and apparatus for agricultural planting including selecting and varying agricultural input types during an in-field operation. In one embodiment, a method calculates a partial addition of seed to a seed pool during planting to minimize or eliminate seeds in the seed pool as a boundary is crossed.

24 Claims, 16 Drawing Sheets

SYSTEMS, METHODS, AND APPARATUS FOR CROP INPUT VARIETY SELECTION

RELATED APPLICATIONS

This application claims the benefit of U.S. Provisional Application No. 62/772,170 filed on Nov. 28, 2018 entitled: SYSTEMS, METHODS, AND APPARATUS FOR CROP INPUT VARIETY SELECTION, the entire contents of which are incorporated by reference herein.

TECHNICAL FIELD

Embodiments of the present disclosure relate to systems, methods, and apparatus for agricultural planting including effectively selecting and varying agricultural input types during an in-field operation.

BACKGROUND

In recent years, the ability to control crop input applications on a site-specific basis (known as "precision farming") has increased interest in varying input types throughout a field. In particular, advances in seed genetics and agronomic research have increased the need for solutions enabling the variation of seed types in the field during a planting operation. Some proposed solutions involve shifting between input types fed to the metering units, which may result in blending of input types at the metering units and thus blended input regions in the field.

BRIEF DESCRIPTION OF THE DRAWINGS

The present disclosure is illustrated by way of example, and not by way of limitation, in the figures of the accompanying drawings and in which.

BRIEF SUMMARY

In one embodiment, a process for determining seed volume of seeds used during planting is described herein.

DETAILED DESCRIPTION

All references cited herein are incorporated herein in their entireties. If there is a conflict between a definition herein and in an incorporated reference, the definition herein shall control.

U.S. Patent Application Publication Number 2018/0148276 discloses a method of calculating seed volume.

There is a need in the art for systems, methods and apparatus for effectively selecting and varying agricultural input types during an in-field operation to quickly transition between input types to limit blending between seed types. In one embodiment, a method of minimizing or eliminating seeds in a seed pool as a boundary is approached.

Figure 1:
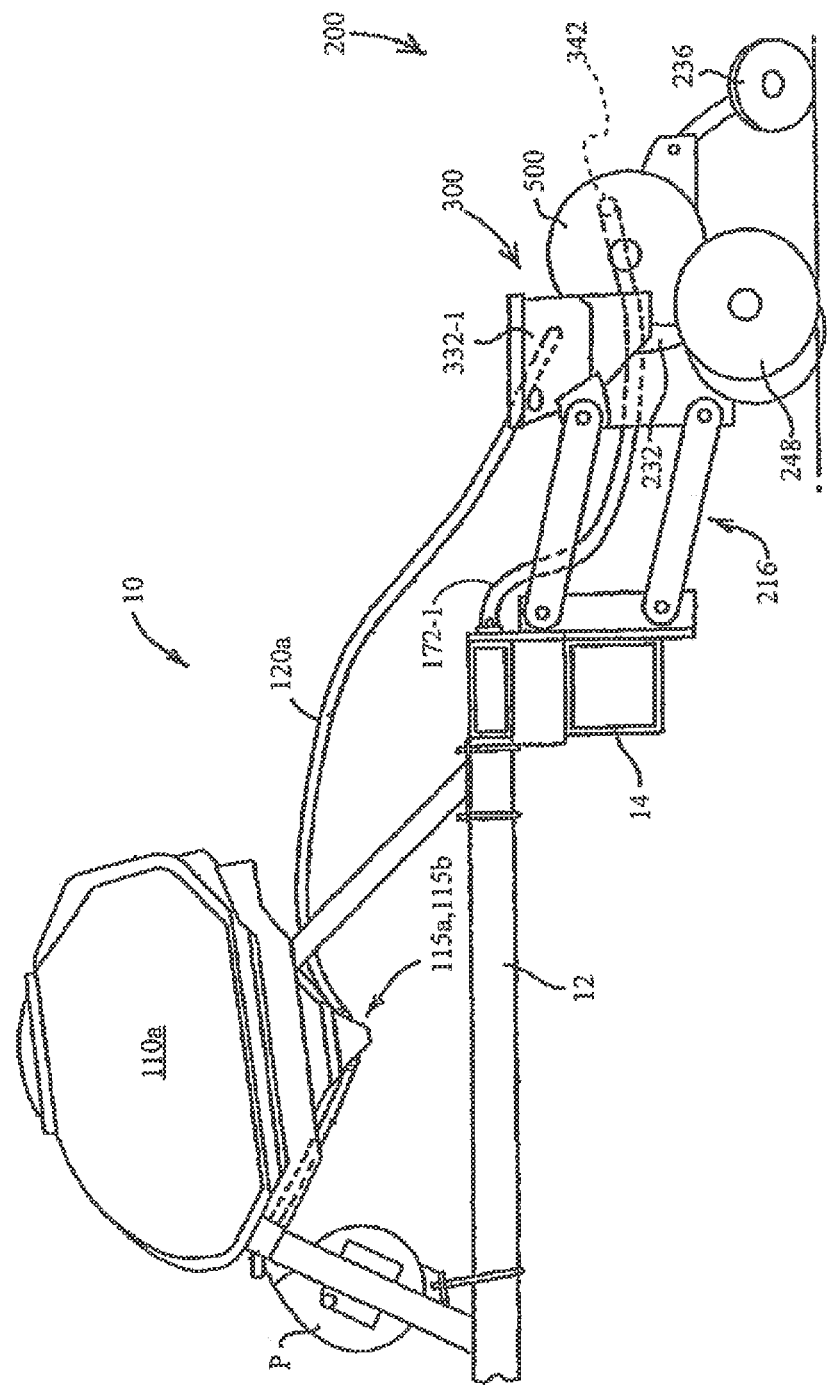
FIG. 1 is a side elevation view of an embodiment of a row crop planter.

Referring now to the drawings, wherein like reference numerals designate identical or corresponding parts throughout the several views, FIG. 1 illustrates a planter 10 having a frame 12 including a transversely extending toolbar 14. A plurality of row units 200 are mounted to the toolbar 14 in transversely spaced relation. A plurality of bulk hoppers 110 are preferably supported by the frame 12 and in seed and pneumatic communication with the row units 200.

Figure 2:
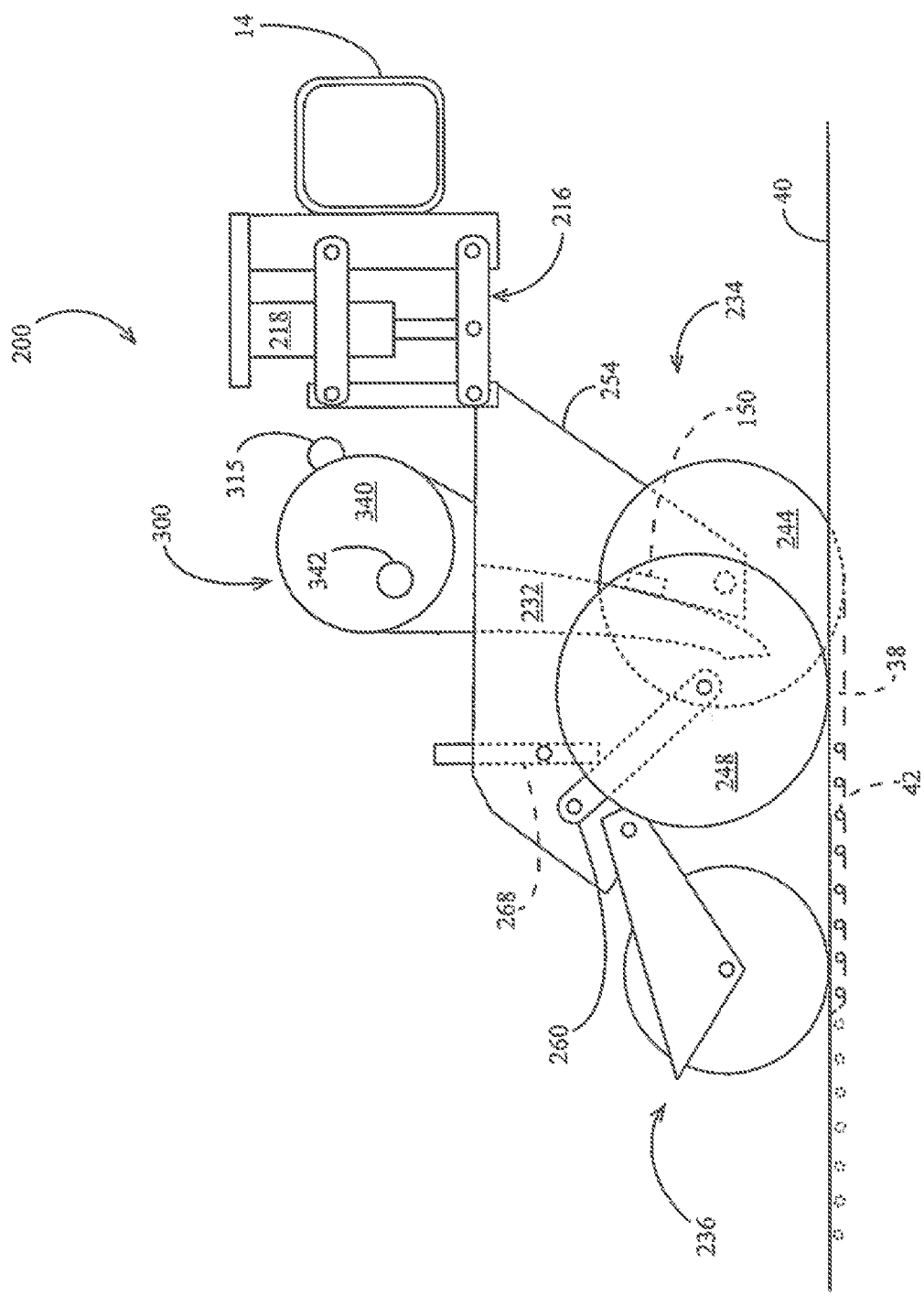
FIG. 2 is a side elevation view of an embodiment of a planter row unit.

Turning to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve (not shown) is preferably in fluid communication with the actuator 218 for modifying the lift and/or downforce applied by the actuator. An opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A downforce sensor (not shown) is preferably configured to generate a signal related to the amount of force imposed by the gauge wheels 248 on the soil 40; in some embodiments the downforce sensor comprises an instrumented pin about which the rocker 268 is pivotally coupled to the row unit 200, such as those instrumented pins disclosed in Applicant's U.S. Patent Publication No. US2010/10180695.

Continuing to refer to FIG. 2, a seed meter 30, such as that disclosed in Applicant's International Patent Application No. PCT/US2012/030192 ("the '192 application"), is preferably mounted to the row unit 200 and disposed to deposit seeds 42 into the trench 38, e.g., through a seed tube 232 disposed to guide the seeds toward the trench. In other embodiments, the seed tube 232 is replaced with a seed conveyor such as that disclosed in Applicant's International Patent Application No. PCT/US2012/057327 ("the '327 application") or Applicant's U.S. Provisional Patent Application No. 621192,309. In alternative embodiments, a plurality of seed meters 300 may be mounted to the row unit 200 and disposed to deposit seeds 42 into the same trench 38, e.g., through the same seed tube 232 or seed conveyor.

Figure 5:
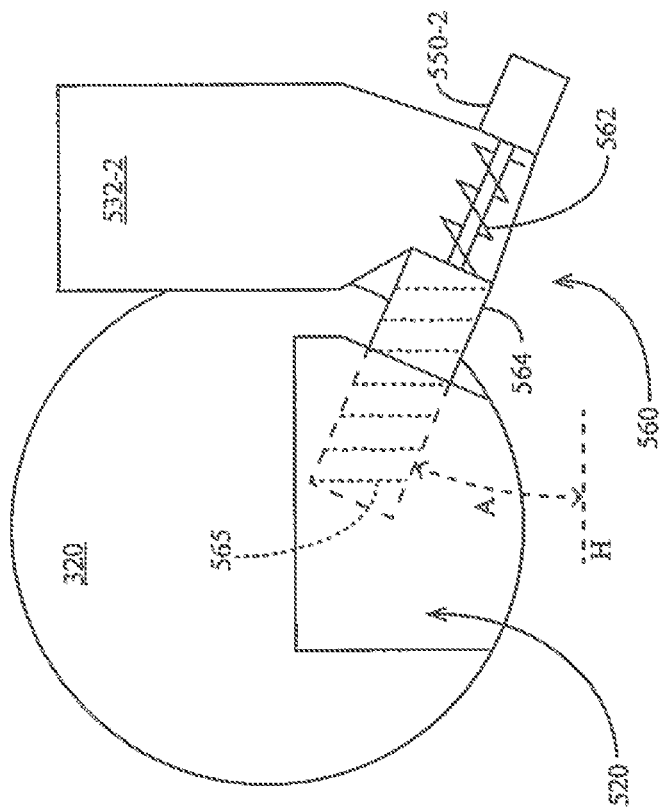
FIG. 5 is a side elevation view the embodiment of FIG. 4.
Figure 4:
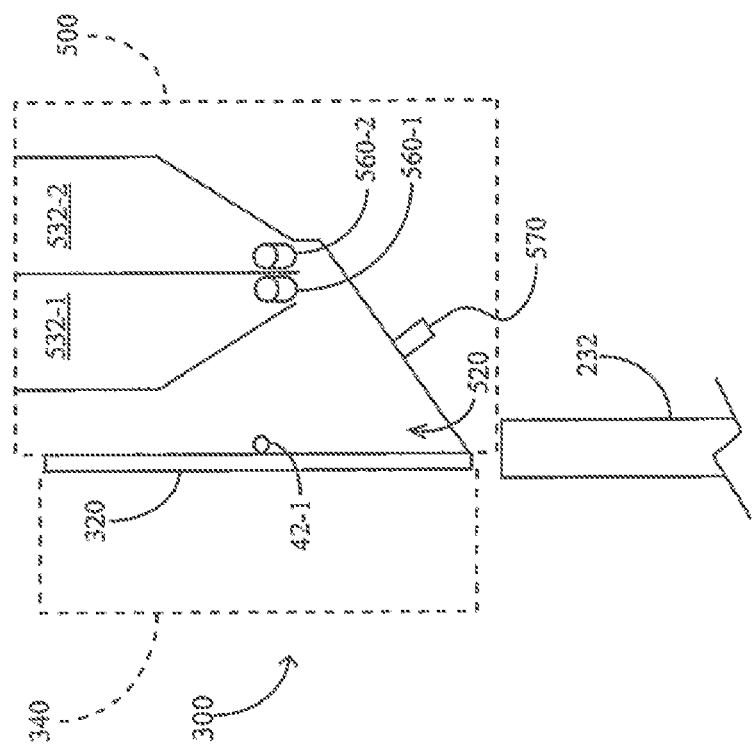
FIG. 4 is a front elevation view of an embodiment to selectively supply seed to a seed meter from different auxiliary hoppers.

Referring to FIGS. 2, 4 and 5, the seed meter 300 preferably includes a seed side housing 500 having a first auxiliary hopper 532-1 for storing seeds 42 to be deposited by the seed meter and a second auxiliary hopper 532-2 for storing seeds 42 to be deposited by the seed meter. The seed meter 300 preferably includes a vacuum side housing 340 including a vacuum port 342 for pulling a vacuum within the vacuum side housing 340. The seed meter 300 preferably includes a seed disc 320 including a plurality of seed apertures (not shown); the seed disc 320 preferably separates interior volumes of the vacuum side housing 340 and the seed side housing 500. In operation, seeds 42 communicated from the auxiliary hoppers 532 into a seed pool 520 of the seed side housing 500 are captured on the seed apertures due to the vacuum in the vacuum side housing 340 and then released into the seed tube 232 (or seed conveyor). The seed meter 300 is preferably powered by individual electric drives 315. Each drive 315 is preferably configured to drive the seed disc 320 within the seed meter 300. Each electric drive preferably comprises an electric drive such as one of the embodiments disclosed in International Patent Application No. PCT/US2013/051971 and/or U.S. Pat. No. 7,617,785. In alternative embodiments, the drive 315 may comprise a hydraulic drive or other motor configured to drive the seed disc. In one embodiment, seed meter 300 can be sized to minimize the volume of seed pool 520 so that there are fewer seeds in seed pool 520 that have to be managed as a variety boundary is approached.

Referring to FIGS. 4 and 5, seed is preferably selectively supplied to the seed pool 520 from one of the auxiliary hoppers 532-1, 532-2 at a time by selective actuation of one or more seed transfer actuators 550 which drive seed tenders 560-1, 560-2. The seed tender 560 being actuated transfers seed from its associated auxiliary hopper 532 to the seed pool 520. In the embodiment shown in FIG. 5, each seed tender 560 comprises an auger 564 (e.g., a cylindrical auger having internal flights). Each seed tender 560 preferably additionally includes a preloading auger 562 which preferably loads seeds into the auger 564 and preferably agitates seeds at the bottom of the associated auxiliary hopper 532. An inlet end of the auger 564 is preferably disposed vertically tower than an outlet end of the auger such that seed does not flow through the auger by gravity and instead flows only upon selective actuation of the auger. For example, the auger (e,g,, a sidewall of the auger, a rotational andior central axis of the auger, a transport vector along which seeds are tendered by the auger) may be disposed at an angle A (e.g., between 0 and 90 degrees; between 10 and 80 degrees; between 20 and 70 degrees; between 30 and 60 degrees; between 40 and 50 degrees; between 0 and 10 degrees; between 10 and 20 degrees; between 20 and 30 degrees; between 30 and 40 degrees; between 50 and 60 degrees; between 60 and 70 degrees; between 70 and 80 degrees; between 80 and 90 degrees; approximately 0, 5, 10, 15, 20, 25, 30, 35, 40, 45, 50, 55, 60, 65, 70, 75, 80, 85, or 90 degrees; 0, 5, 10, 15, 20, 25, 30, 35, 40, 45, 50, 55, 60, 65, 70, 75, 80, 85, or 90 degrees) relative to a horizontal plane H.

In operation, the auxiliary hoppers 532-1, 532-2 are filled with a first and second seed variety, respectively. The filling step may be completed by the central seed distribution system illustrated in FIG. 1 or manually by the operator. Seed is preferably not transferred from either of the auxiliary hoppers 532 to the seed pool 520 until, one of the seed transfer actuators 550 drives an associated seed tender 560. Taking the seed tender 560-1 as an example, when the seed transfer actuator 550-1 operates the seed tender 560-1, seed is preferably transferred from the auxiliary hopper 532 to the seed pool 520 by operation of the seed transfer actuator. In the embodiment shown in FIG. 5, when the seed transfer actuator is operated (i.e., driven for rotation), rotation of the pre-loading auger 562 pushes seeds into an internal volume of the auger 564 and rotation of the auger 564 due to the motion of internal flights 565 extending along an inner surface of the auger 564.

Figure 7:
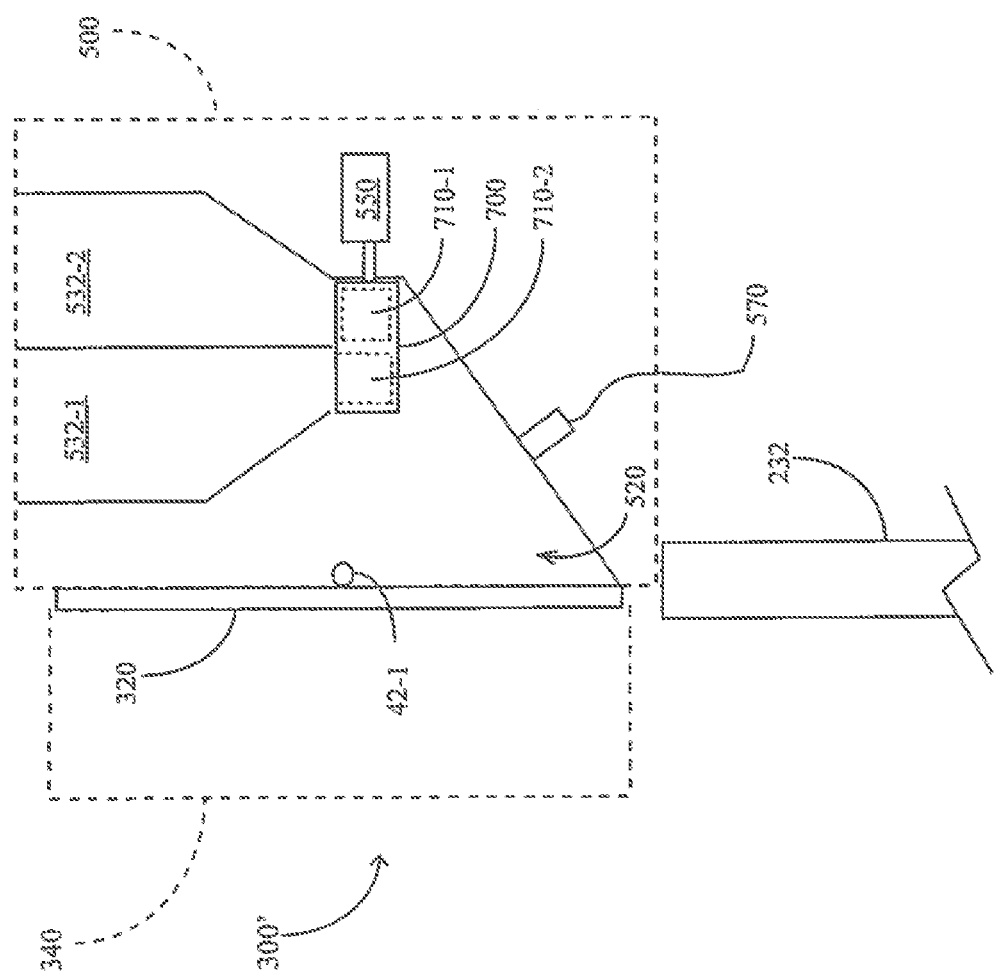
FIG. 7 is a side elevation view of another embodiment to selectively supply seed to a seed meter from different auxiliary hoppers.

In alternative embodiments, each seed tender 560 may be other structure configured to selectively transfer seed or permit seed transfer from an auxiliary hopper 532 to the seed pool 520. Some such embodiments include carousels, paddle wheels, dosing wheels, or gates. One such alternative embodiment is illustrated in FIG. 7, where the seed tender comprises a dosing element 700 having two dosing gates 710-1, 710-2 preferably disposed to receive seed from (e.g., vertically below a lower outlet of) the auxiliary hoppers 532-1, 532-2 respectively. In a first position (e,g., the orientation in which the dosing gate 710-1 is illustrated) the dosing gate prevents flow of seed from the associated auxiliary hopper by gravity into the seed pool 520 and preferably receives and stores a dose of seed from the associated auxiliary hopper in an interior volume of the dosing gate. In a second orientation (e.g., the orientation in which the dosing gate 710-2 is illustrated), seed is retained in the associated auxiliary hopper by contact with a sidewall of the dosing gate and is not allowed to enter the interior volume of the dosing gate. In a third position (not illustrated but preferably 180 degrees from the orientation in which the dosing gate 710-1 is illustrated), the dosing gate permits flow of seed from the interior volume of the dosing gate by gravity into the seed pool. The first and second dosing gates 710-1, 710-2 are preferably oriented relative to one another (e.g., at 90 degrees) such that the first dosing gate is in the first orientation when the second dosing gate is in the second orientation. In operation, the seed transfer actuator 550 preferably selectively rotates the dosing gates 710 between the first, second and third positions to selectively dose seed into the seed pool 520. For example, to meter a controlled amount of seed from auxiliary hopper 532-1, the first dosing gate 710-1 is preferably alternately rotated between the first and third orientations while the second dosing gate remains in the second position or moves through a range of positions in which seed does not enter the interior volume of the second dosing gate. In an alternative embodiment, the dosing gate may include an open position in which seed is permitted to flow from the associated hopper into the seed pool.

In some embodiments, a fill level sensor 570 (FIG. 4) is provided for sensing a fill level of the seed pool 520. The fill level sensor 570 may comprise an optical sensor provided in the seed pool 520 (e.g., paired with a light source which is only visible when the seed pool is not filled passed a threshold level). The fill level sensor 570 may alternatively comprise a range sensor (e.g., ultrasonic, ultrasound, capacitance) configured to measure a distance between the sensor and an upper surface of seeds accumulated in the seed pool 520. The fill level sensor 570 may alternatively comprise a capacitance sensor. In some embodiments, a first fill level sensor may be provided for determining whether the seed pool is filled to a first level and a second fill level sensor may be provided for determining whether the seed pool is filled to a second (e.g., higher or more full) level. A fill level sensor 570 simplifies the system by not having to count the number of seeds added to or dispensed from seed pool 520. The placement of fill level sensor 570 in the seed pool can be based on the volume of the seed pool at the location along with knowing the volume of each seed to translate into an approximate number of seeds. In some embodiments, there is no seed counter for counting the number of seeds that are supplied to seed pool 520. In one embodiment for corn seeds, fill level sensor 570 is disposed such that the level of seeds detected includes at least 150 seeds in the seed pool 520. When the seed pool 520 drops below fill level sensor 570 a signal is sent to the seed transfer actuator to open a flow path to a desired seed hopper (described below) to add more seeds to seed pool 520. The volume of the seed pool 520 can be minimized by making the space smaller, such as by including a baffle (not shown) to fill a portion of the volume.

The placement of fill level sensor 570 can assist in switching from one seed type to a second seed type such that the feeding from one auxiliary hopper is shut off as a boundary between seed variety regions is approached such that the number of seeds of a first type in seed pool 520 is minimized before crossing the boundary. Just before the boundary is crossed, seeds of a second type can be added to seed pool 520. It is preferable to always have seeds in the seed pool so that planting is maximized. Some seeds of one type can be planted in another region, but the prescription error is minimized. Knowing the number of seeds in seed pool 520 at the fill level sensor 570 and the rate of speed of the tractor, a time delay can be used for the switching of the seed types.

The seed transfer actuators 550 may comprise electric motors. In some single-actuator embodiments, a single seed transfer actuator 550 may drive both seed tenders 560. In one single-actuator embodiment, a single seed transfer actuator 550 has an output shaft which when driven in a first direction drives the first seed tender in a first direction which transfers seed and drives the second seed tender in a second (e.g., opposite) direction which does not transfer seed; thus when the single seed transfer actuator is driven in the first direction, only the first seed tender delivers seed. In another single-actuator embodiment, the single seed transfer actuator drives by both seed tenders 560 means of a clutch (e.g., a sprag clutch) such that when the seed transfer actuator drives an output shaft thereof in a first direction, only the first seed tender is driven, and when the seed transfer actuator drives the output shaft in a second (e.g., opposite) direction, only the second seed tender is driven.

A seed sensor 150 (e.g., an optical or electromagnetic seed sensor configured to generate a signal indicating passage of a seed) is preferably mounted to the seed tube 232 (or the seed conveyor) and disposed to send light or electromagnetic waves across the path of seeds 42. A closing system 236 including one or more closing wheels is pivotally coupled to the row unit 200 and configured to close the trench 38.

Figure 3:
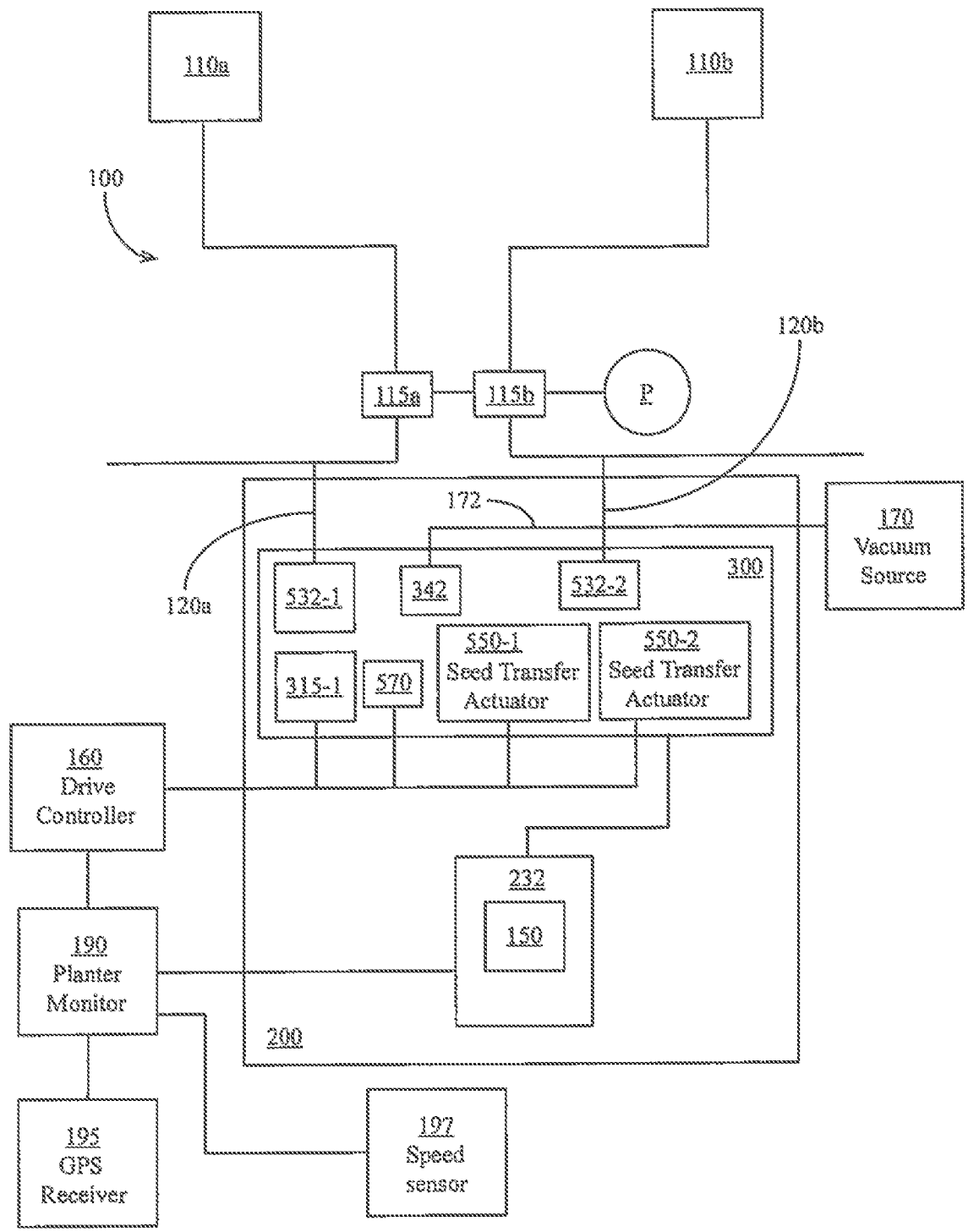
FIG. 3 schematically illustrates art embodiment of a seed variety selection system.

Turning to FIG. 3, a seed variety selection system 100 is illustrated. The system 100 preferably includes a plurality of bulk hoppers 110 (e.g., two bulk hoppers 110a and 110b as illustrated). The first bulk hopper 110a preferably contains a first seed variety (e.g., a first corn seed variety or a first soybean variety); the second bulk hopper 110b preferably contains a second seed variety (e.g., a second corn seed variety or a second soybean variety). Each bulk hopper is preferably in fluid communication with an individual seed entrainer 115. Each seed entrainer 115 is preferably mounted to a lower outlet of the associated bulk hopper 110. Each seed entrainer 115 is preferably in fluid communication with a pneumatic pressure source P and configured to convey air-entrained seeds through a plurality of seed lines 120 to the row units 200. Via a plurality of seed lines 120a, the bulk hopper 110a and the entrainer 116a are preferably in seed communication with a first auxiliary hopper 532-1 of the seed meter 300 of each row unit 200 along the tool bar 14. In operation, the bulk hopper 110a supplies the first seed variety to the first auxiliary hopper 532-1 of the seed meter 300 of each row unit 200. Via a plurality of seed lines 120b, the bulk hopper 110b and the entrainer 115b are preferably in seed communication with a second auxiliary hopper 532-2 of the seed meter 300 of each row unit 200 along the toolbar 14. In operation, the bulk hopper 110b supplies the second seed variety to the second auxiliary hopper 532-2 of the seed meter 300 of each row unit 200.

Continuing to refer to FIG. 3, the drive 315 is preferably in data communication with a drive controller 160. The drive controller is preferably configured to generate a drive command signal corresponding to a desired rate of seed disc rotation. The drive controller 160 is preferably in data communication with a planter monitor 190. The planter monitor 190 preferably includes a memory, a processor, and a user interface. The planter monitor is preferably configured to send drive command signals and/or desired rates of seed disc rotation to the drive controller 160. The planter monitor 190 is preferably in data communication with a GPS receiver 195 mounted to either the planter 10 or the tractor used to draw the planter. The planter monitor 190 is preferably in data communication with a speed sensor 197 (e.g., a radar speed sensor) mounted to either the planter 10 or the tractor. As used herein, "data communication" may refer to any of electrical communication, electronic communication, wireless (e.g, radio) communication, or communication by any other medium configured to transmit analog signals or digital data, Continuing to refer to FIG. 3, each vacuum port 342 is preferably in fluid communication with a vacuum source 170 via a vacuum line 172.

Continuing to refer to FIG. 3, the seed meter 300 of the row unit 200 is preferably lai seed communication with (e.g., disposed to deposit seed into) a seed tube 232 (or seed conveyor) associated with the row unit 200. The seed sensor 150 associated with the seed tube 232 of each row unit 200 is preferably in data communication with the planter monitor 190.

Continuing to refer to FIG. 3, the planter monitor 190 is preferably in data communication with a fill level sensor 570 associated with the meter 300 and one or more seed transfer actuators 550 associated with the meter 300.

Figure 9:
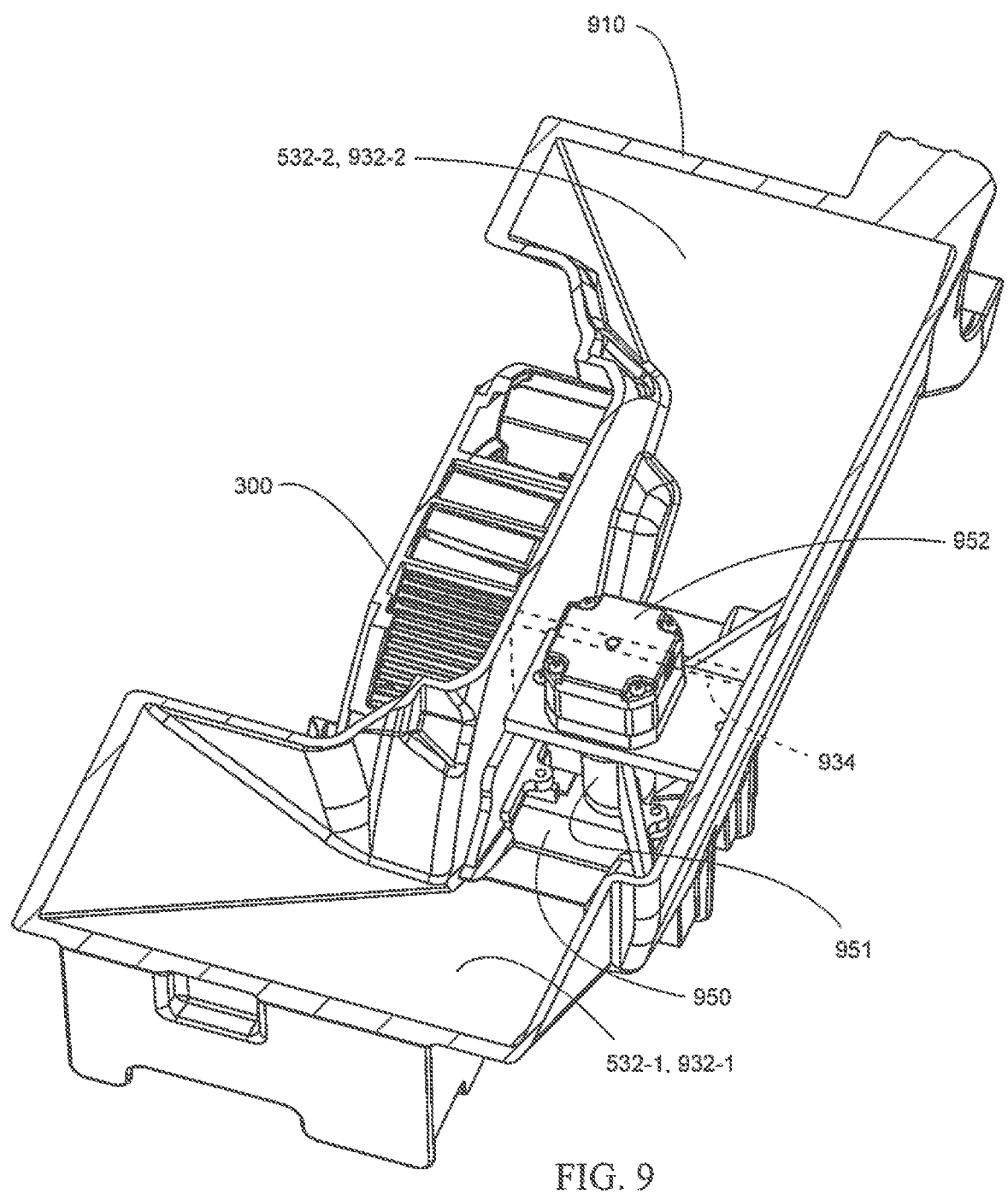
FIG. 9 is another embodiment for selectively supplying seed to a seed meter showing a partial cut-away perspective view of row unit seed hopper divided into compartments and utilizing seed transfer actuator in the form of a rotating gate.
Figure 10:
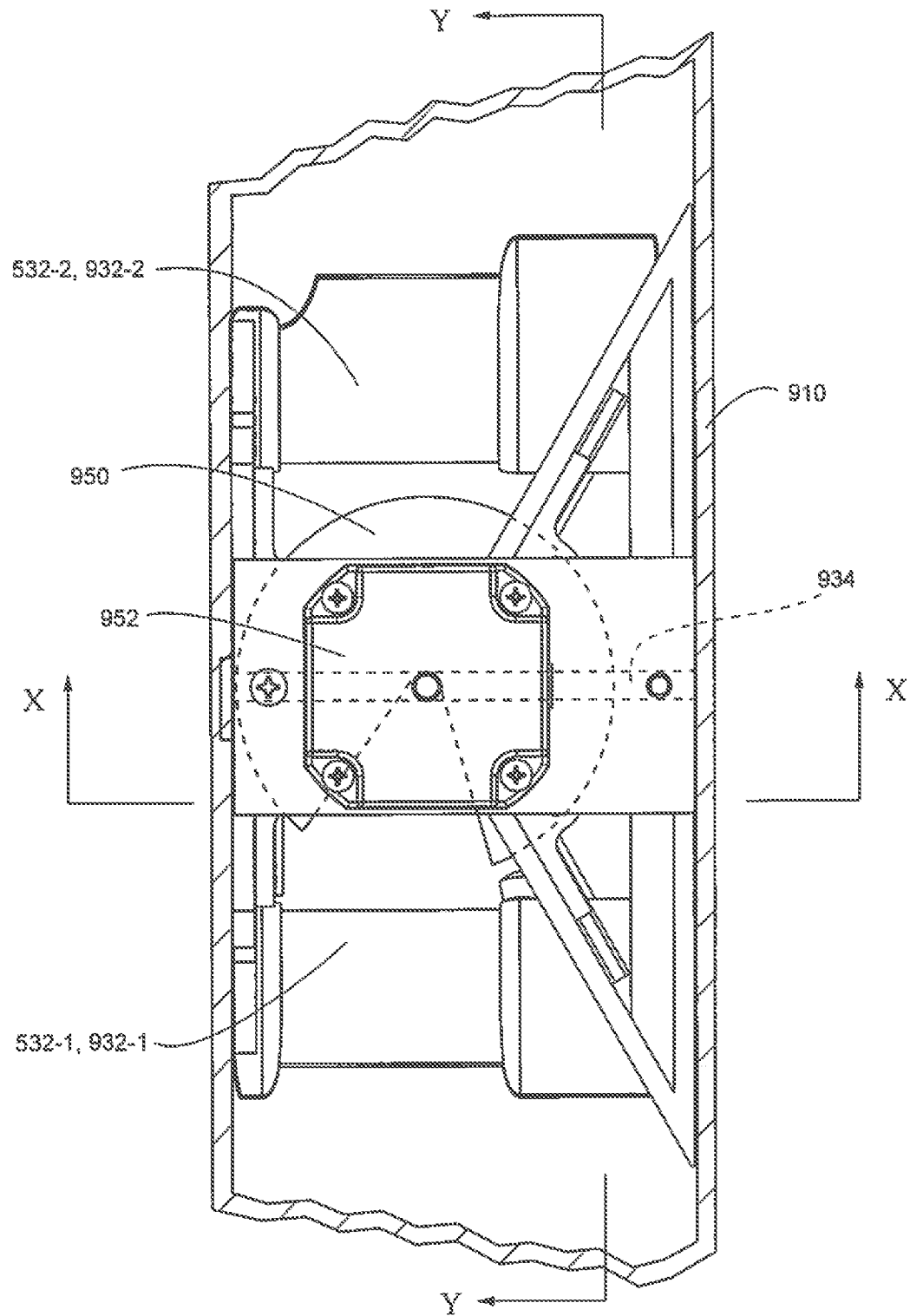
FIG. 10 is a top plan view of the embodiment of FIG. 9 showing the rotating gate.
Figure 12:
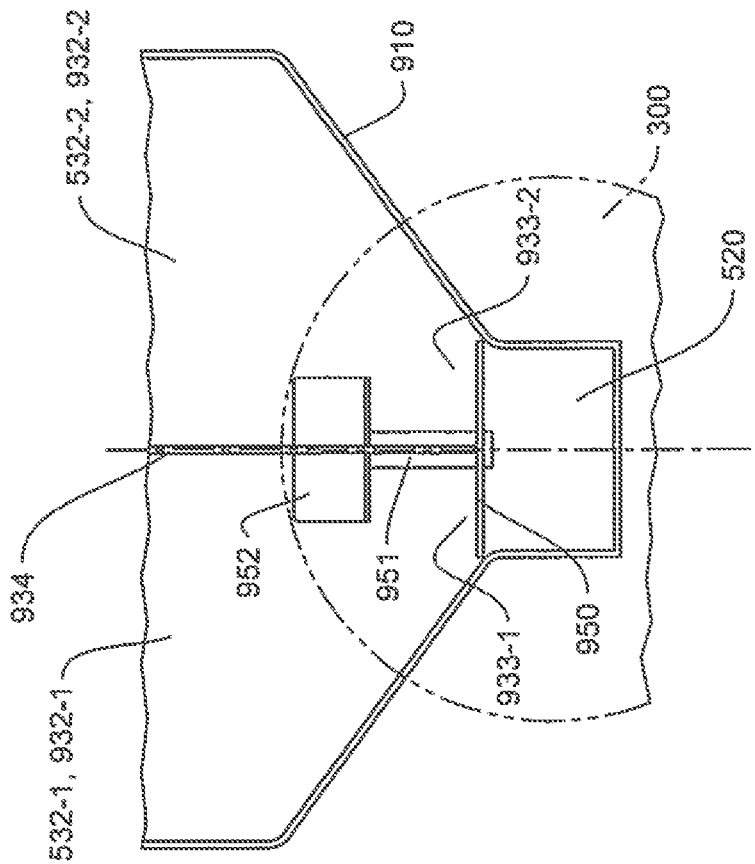
FIG. 12 is a cross-sectional view along lines Y-Y of FIG. 10.
Figure 11:
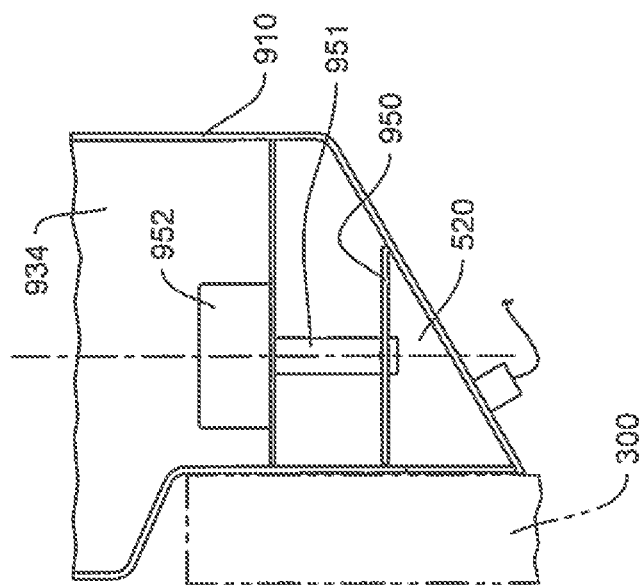
FIG. 11 is a cross-sectional view along lines X-X of FIG. 10.

FIGS. 9-13 illustrate another embodiment for selectively supplying seed to a seed meter 300 wherein the first auxiliary hopper 532-1 and the second auxiliary hopper 532-2 are separate compartments 932 within a row unit seed hopper 910. FIG. 9 is a top perspective view showing a partial cutaway of the hopper 910. FIG. 10 is a partial top plan view. FIG. 11 is a cross-sectional view as viewed along lines x-x of FIG. 10. FIG. 12 is a cross-sectional view as viewed along lines Y-Y of FIG. 10. It should be appreciated that the hopper 910 may be divided into a plurality of compartments 932 each holding a different seed variety. The row unit seed hopper 910 is shown with first compartment 932-1 and second compartment 932-2, separated by a divider panel 934. First compartment 932-1 has a first seed passage 933-1, and second compartment 932-2 has a second seed passage 933-2, both of which are in communication with seed transfer actuator 950. Seed transfer actuator 950 is disposed in the bottom of row unit seed hopper 910 to allow for gravity feed of the seed through the first seed passage 933-1 and second seed passage 933-2. Seed transfer actuator is in conanunication with the seed pool 520 and is rotated by a shaft 951 and motor 952.

Figure 13:
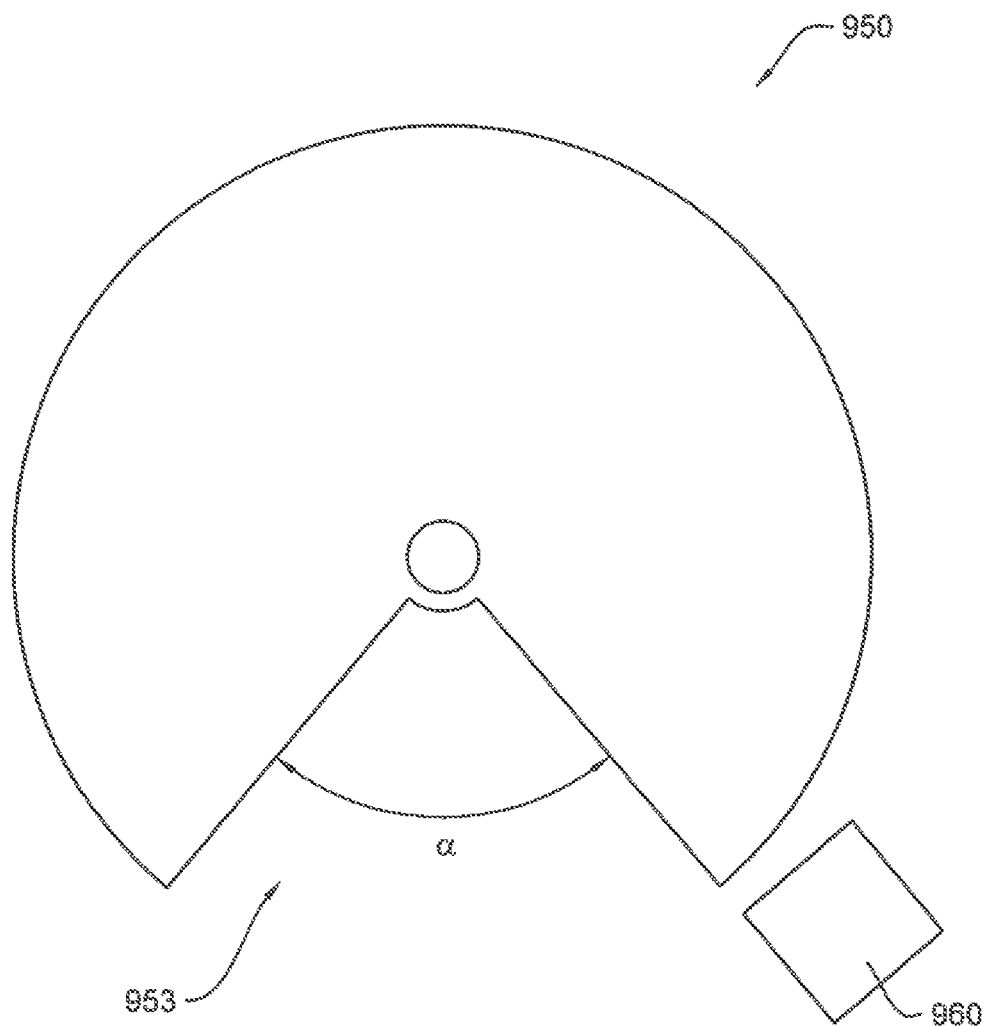
FIG. 13 is a top plan view of the rotating gate of FIG. 10.

Seed transfer actuator 950 is shown in greater detail in FIGS. 10 and 13. In this embodiment, seed transfer actuator 950 is a rotating gate that rotates about a vertical axis A-A. There is an opening 953 in seed transfer actuator 950 which is rotated to align with the seed passage 933 thereby allowing the seeds to pass from the respective compartment 932 to pass through the passage 933 and the opening 953 into the seed pool 520 below. The angle α creating the opening can be any angle that permits one compartment 932 or no compartments 932 to be in communication with seed pool 520. It will be appreciated that with an increasing number of compartments, the angle α will decrease. For the two compartment embodiment shown, angle α is less than 120°. In another embodiment, angle α is less than 90° or about 80°. This rotating gate configuration is simpler to operate compared to a drop gate or a rotary gate rotating about a horizontal axis in that gravity can be used as the driving force to move the seed.

Figure 14:
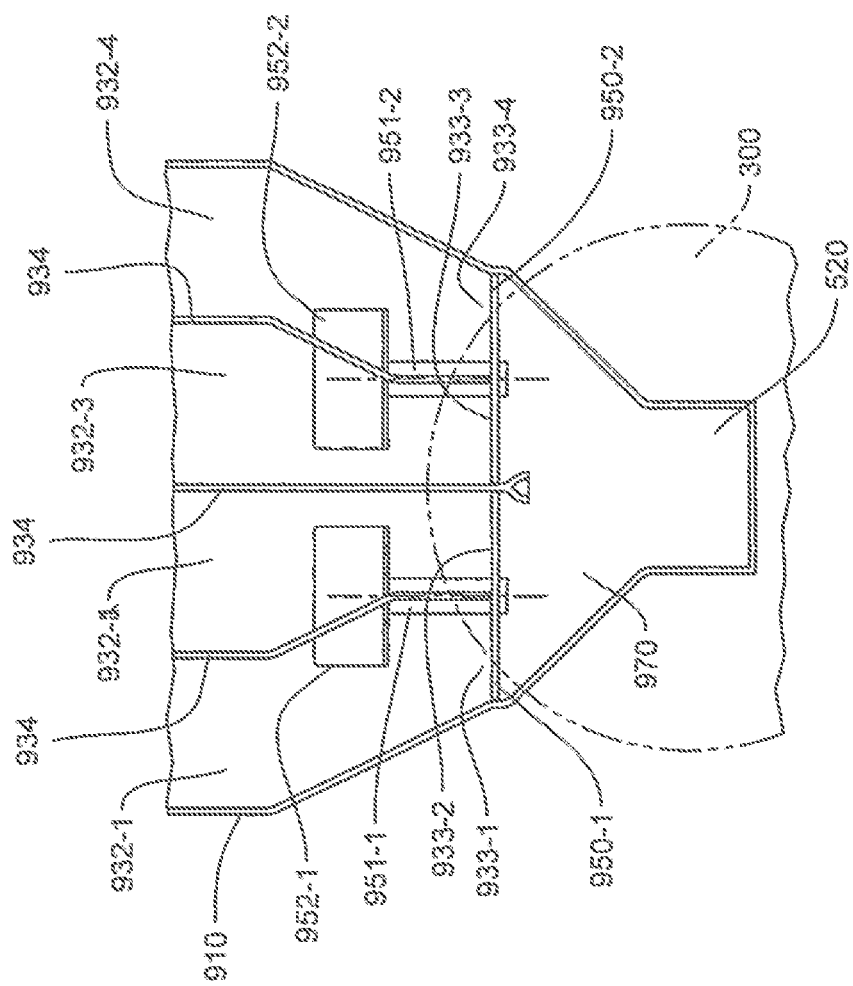
FIG. 14 is a cross-sectional view of an embodiment of a row unit seed hopper similar to FIG. 12 but four compartments and showing an embodiment of a seed pool feeder.

It should be appreciated that as the number of compartments increase, the openings 953 may become so small that seed flow may be too slow to feed the seed pool 520. As shown in FIG. 14, a seed hopper 910 may be divided into four compartments 932-1, 932-2, 932-3, 932-4 with a seed pool feeder 970 disposed below the compartments which is in communication with the seed pool 950 of the seed meter 300. In this embodiment, a first seed transfer actuator 9501 is disposed to be in communication with a first compartment 932-1 and a second compartment 932-2, and a second seed transfer actuator 950-2 is disposed to be in communication with third compartment 932-3 and fotilth compartment 932-4. In operation, one of the seed transfer actuators 950-1 or 950-2 can be commanded to open to allow seeds to flow through one of the respective seed passages 933-1,933-2, 933-3,933-4 and into seed pool feeder 970.

The seed transfer actuator 950 can further include a Hall effect sensor 960 to set a home position of the rotating gate and determining the rotation of seed transfer actuator 950 about the vertical axis.

A benefit of the system is a simplification of each row unit in that only one seed meter is needed at each row unit to plant multiple types of seeds. This reduces the number parts and the cost.

Figure 6:
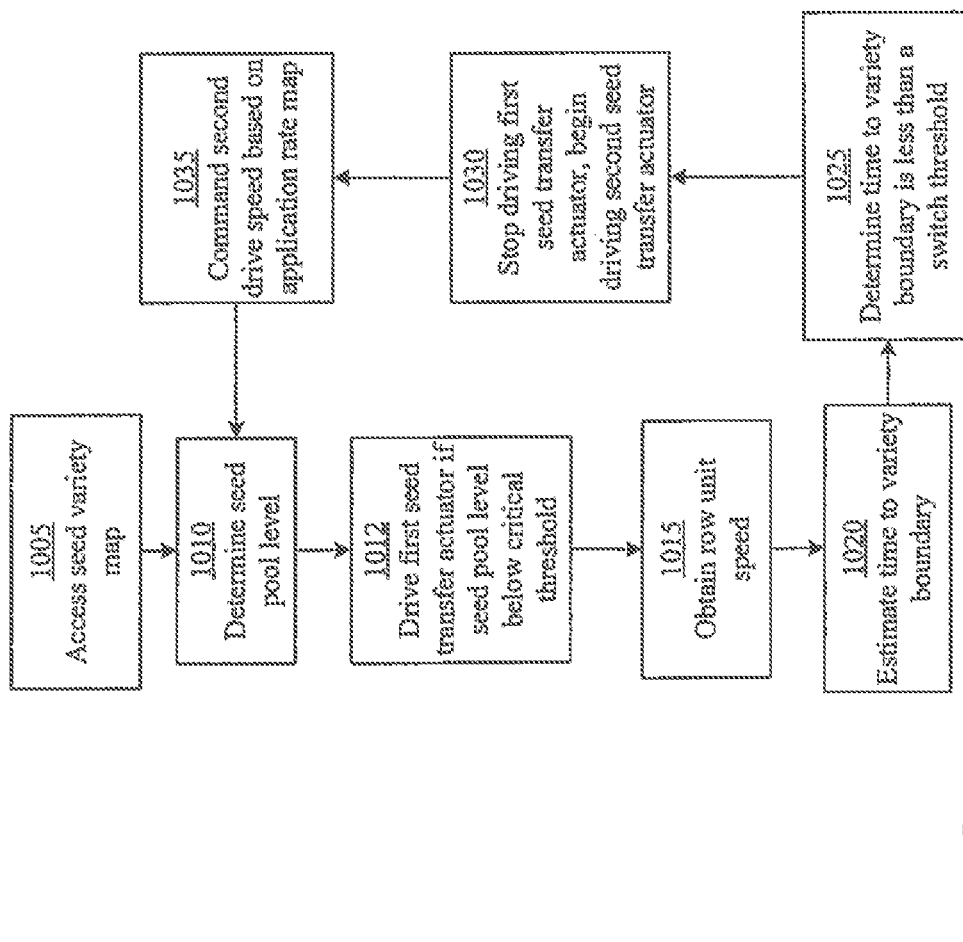
FIG. 6 illustrates art embodiment of a process for changing seed varieties.

Turning to FIG. 6, a process 1000 is illustrated for selecting a seed variety planted by the row units 200 of the variety selection system 100. At step 1005, the planter monitor 190 preferably accesses a seed variety map, preferably stored in the memory of the planter monitor. The seed variety map preferably comprises a file (e.g., a shape file) associating desired seed types with geo-referenced locations. In other embodiments, two separate maps may be used to independently control the seed transfer actuators; in such embodiments the a first map preferably instructs the first seed transfer actuator not to transfer seeds at locations for which the second map instructs the second meter to transfer seeds, and vice versa.

At step 1010, the planter monitor 190 preferably repeatedly determines a seed pool level (e.g., an amount of seeds, height of seeds, or number of seeds) in the seed pool of a first variety stored in auxiliary hopper 532-1. For example, the planter monitor 190 may determine the seed pool level based on the signal from the fill level sensor 570. Alternatively or additionally, the planter monitor 190 may determine the seed pool level based on an estimated amount of seed transferred by the seed tenders 560-1 (e.g., based on a number of rotations of an output shaft of the seed transfer actuator 550) during a preceding time period andior a number of seeds planted (e.g based on seed sensor pulses or measured or commanded seed disc rotations) during the same time period.

At step 1010, if the planter monitor 190 determines the seed pool level is below a critical threshold (e,g., a level required for operation of the seed meter), the planter monitor 190 preferably commands the seed tender 560 to transfer seeds to the seed pool 520 (e.g., until the seed pool level again meets the critical threshold).

At step 1015, the planter monitor 190 preferably obtains the speed of the row unit 200 using one of the methods disclosed in the '327 application. At step 1020, the planter monitor 190 preferably estimates the time to the nearest variety boundary, e.g., by dividing the distance to the variety boundary by the speed of the row unit.

At step 1025, the planter monitor 190 preferably determines that the time to the variety boundary is less than a switch threshold. The switch threshold may correspond to the time required to fill the seed pool to the critical threshold.

At step 1030, upon making the determination of step 1025, the planter monitor 190 preferably stops driving the first seed transfer actuator 550-1. The planter monitor 190 may then optionally wait for seed to be planted from the seed pool 520 until determining that the critical threshold (or another fill threshold such as a higher or lower fill threshold) has been reached as seeds of the first variety are planted from the seed pool 520. The planter monitor 190 then preferably begins driving the second seed transfer actuator 550-2 in order to transfer seeds of the second variety from the auxiliary hopper 532-2 to the seed pool 520.

At step 1035, the planter monitor preferably commands a speed to the second drive 315-2 based on an application rate map stored in the memory of the planter monitor and associating desired application rates with georeferenced locations.

Figure 8:
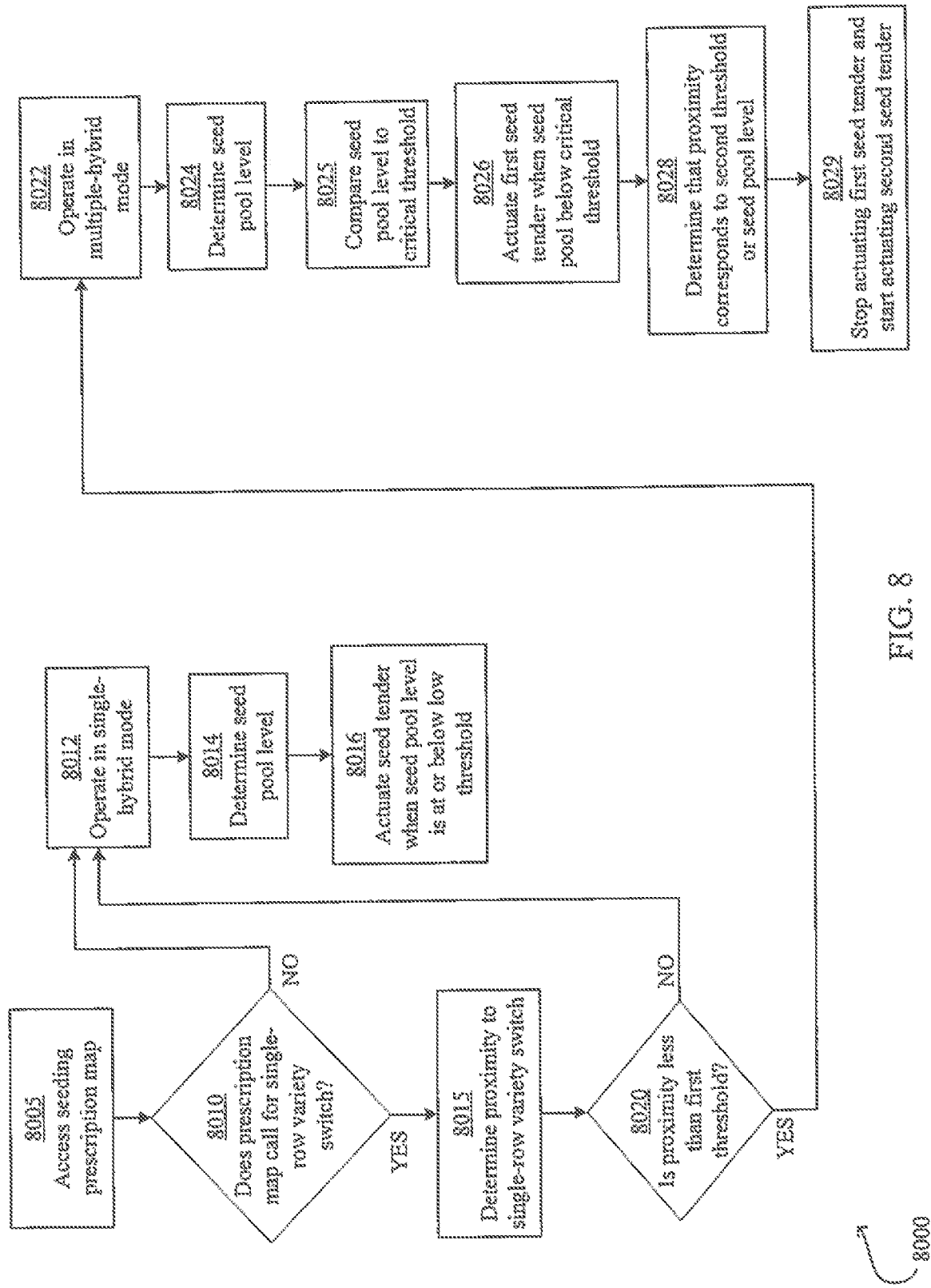
FIG. 8 illustrates another embodiment of a process for changing seed varieties.

Turning to FIG. 8, a process 8000 is illustrated for selecting a seed variety planted by the row units 200 of the variety selection system 100. At step 8005, the planter monitor 190 preferably accesses a seeding prescription map, e.g., a map associating gee-referenced positions in the field with desired seeding rates and/or desired seed varieties.

At step 8010, the planter monitor 190 preferably determines whether the prescription map calls for a single-row variety switch, e.g., whether a row unit 200 should alternate seed types during planting in order to implement the prescription. The determination of step 8010 may be made (1) based on a user input; (2) by determining whether the prescription map calls for planting more than one seed variety in the field; or (3) by determining whether a predicted or desired planting plan includes a single row unit pass that crosses over sub-regions of the field for which the prescription calls for two or more seed varieties.

If the result of step 8010 is "No", then at step 8012 the planter monitor 190 preferably begins to operate in a single-hybrid mode described in more detail below. If the result of step 8010 is "Yes", then upon beginning the planting operation, at step 8015 the planter monitor 190 preferably repeatedly (e.g., at regular intervals such as every 10 seconds or every 10 feet of travel of the implement) determines a proximity of each row unit 200 to a single-row variety switch.

The proximity determination of step 8015 may be made based on the shortest distance between the contemporaneous (e.g, GPS-reported) position of the implement (e.g., the row unit 200 of the planter) and any boundary between seed variety regions along the current travel direction of the implement. The proximity may be determined in terms of any of the following: (1) distance (e.g., simply the shortest distance described in this paragraph); time (e.g., the estimated time required to travel the shortest distance based on the contemporaneous radar- or GPS-reported implement speed); or number of seeds (e.g., a number of seeds to be planted along the shortest distance based on the planting rate or population called for by the seeding prescription).

At step 8020, the planter monitor 190 preferably compares the proximity determined at step 8015 to a first proximity threshold (e.g., a threshold distance, time, or number of seeds depending on the type of proximity determined at step 8015) and determines whether the proximity is less than the proximity threshold.

If the result of step 8020 is "No", then at step 8012 the planter monitor 190 preferably begins to operate in a single-hybrid mode (described in more detail below) until the result of step 8020 is "Yes". If the result of step 8020 is "Yes", then at step 8022 the planter monitor 190 preferably begins to operate in a multiple-hybrid mode (described in more detail below), One embodiment of a single hybrid mode begun at step 8012 comprises the following steps. At step 8014, the planter monitor 190 preferably determines a seed pool level according to one of the methods described herein with respect to process 1000. At step 8014, the planter monitor 190 preferably actuates a first seed tender (e, g., drives a seed transfer actuator such that a the first seed tender such as a first auger transfers seed from a first seed hopper to the seed pool) upon determining that the seed pool is below a "low" threshold such as that described herein with respect to process 1000.

One embodiment of a multiple-hybrid mode begun at step 8022 comprises the following steps. At step 8024 the planter monitor 190 preferably determines a seed pool level according to one of the methods described herein with respect to process 1000. At step 8025, the planter monitor 190 preferably compares the seed pool level to a "critical" threshold such as that described herein with respect to process 1000. The "critical" threshold preferably corresponds to a lower threshold (e.g., lower seed pool height, smaller number of seeds) than the "low" threshold. The "critical" threshold may correspond to a number of seeds between 10 and 100 seeds for corn seed, e.g., 10, 20, 30, 40, 50, 60, 70, 80, or 90 seeds. In some embodiments, the "critical" threshold may be determined by referencing a database relating one of a plurality of "critical" thresholds to various combinations of crop types, seeding rates, and implement speeds. At step 8026, upon determining that the seed pool is below the "critical" threshold, the planter monitor 190 preferably actuates the first seed tender. At step 8028, the planter monitor 190 preferably determines that the proximity to a variety switch (e.g to a variety switch boundary) corresponds to a second proximity threshold. The second proximity threshold is preferably lower than the first proximity threshold. In other embodiments, at step 8028 the planter monitor 190 instead determines that the proximity to a variety switch corresponds to the seed pool level; for example, by determining that a proximity value measured in seeds (or corresponding to a number of seeds) corresponds to the number of seeds to be planted. Once the determination of step 8028 has been made, the planter monitor 190 optionally delays step 8029 until an optional delay (e.g., a threshold time, a threshold distance traveled, a threshold number of seeds planted and detected by the seed sensor 150) has passed. At step 8029, the planter monitor 190 preferably stops actuating the first seed tender and begins actuating the second seed tender. After step 8029, the planter monitor 190 preferably returns to step 8015 to determine the proximity to the next variety switch.

In another embodiment, the seed variety system 100 can measure the size of seeds. This eliminates having to know the size of seeds to approximate the number of seeds in seed pool 520. Seed sensor 150 and fill level sensor 570 are used in conjunction. This combination will be illustrated with the embodiment described in FIGS. 9-13.

Figure 15:
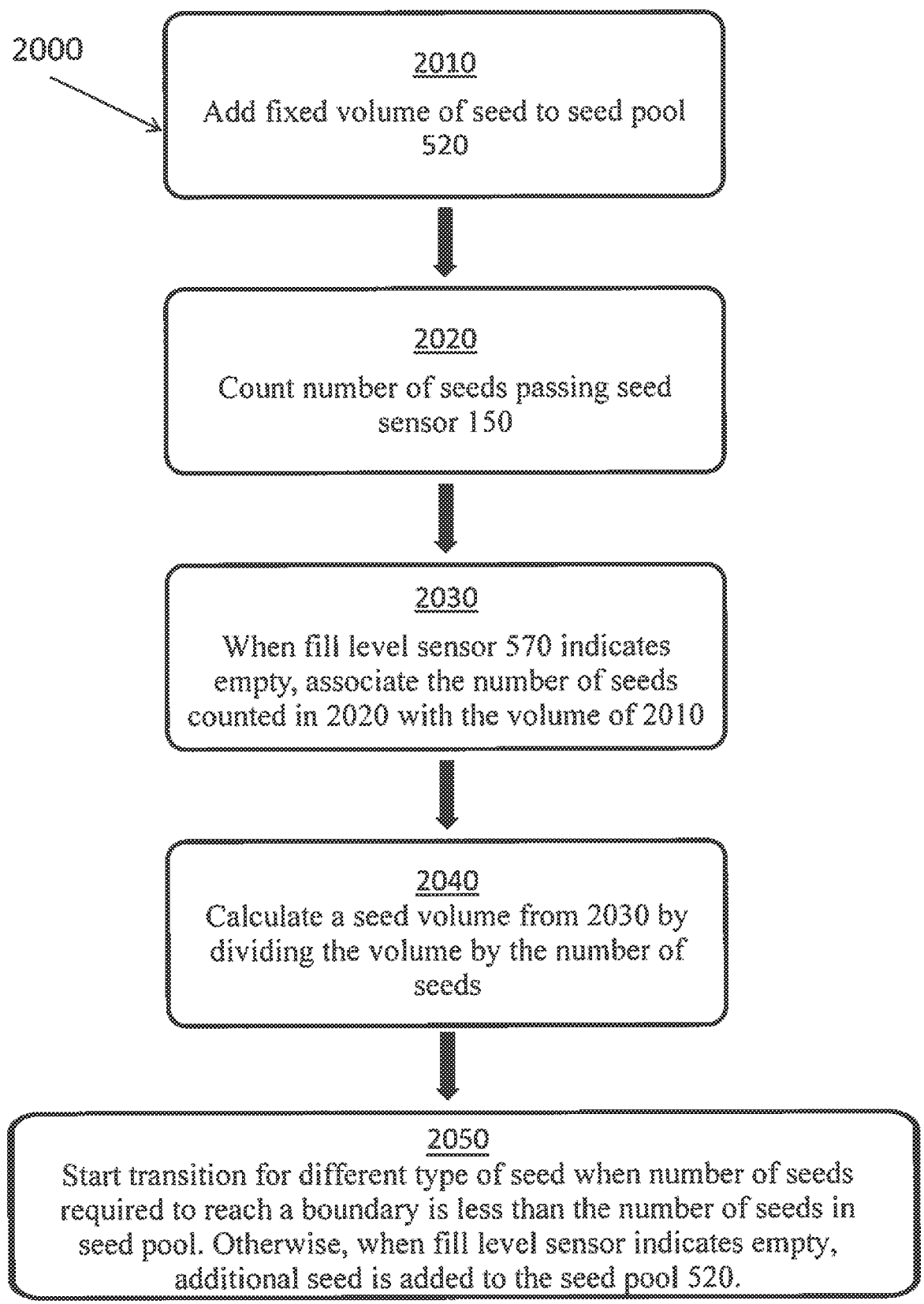
FIG. 15 illustrates a method for determining seed volume in accordance with one embodiment.

Fill level sensor 570 is disposed in seed pool 520 such that a volume in seed pool 520 below the fill level sensor is known. Seed sensor 150 counts the number of seeds passing the seed sensor. When fill level sensor 570 detects that the level of seeds in seed pool 520 is below fill level sensor 570, a signal is sent to actuator 950 to provide an opening to the selected compartment (932-1 or 932-2) in hopper 910 for a set period of time to allow a set volume of seed to be dumped into seed pool 520. After each dump, the number of seeds passing seed sensor 150 is counted until the next dump. The number of seeds counted along with the volume of seeds dumped is used to calculate seed volume by dividing the volume by the number of seeds as illustrated in a method 2000 of FIG. 15 in accordance with one embodiment. The method 2000 is performed by processing logic that may comprise hardware (circuitry, dedicated logic, etc.), software (such as is run on a general purpose computer system or a dedicated machine or a device), or a combination of both. In one embodiment, the method 2000 is performed by components (e.g., a planter monitor 190, a processor, a fill level sensor 570 associated with the meter 300, seed transfer actuators 550 associated with the meter 300, seed pool 520) of the seed varietal selection system 100.

At operation 2010, a fixed volume of seed is added to a seed pool (e.g., seed pool 520). At operation 2020, a number of seeds passing a seed sensor (e,g., seed sensor 150) is counted. A number of gate openings can also be counted to calculate a running average and then calculate the number of seeds per gate opening. The number of seeds per gate opening can be correlated to seed size. The running average can be used for each seeds per dump calculation to have an ongoing average seed size. It will be appreciated that in a given volume there are fewer larger seeds as compared to smaller seeds. For example, when planting large seed, fewer seeds are dispersed per gate opening than small seeds, At operation 2030, when a fill level sensor 570 indicates empty, the number of seeds counted at operation 2020 is associated with the volume of seed added at operation 2010. At operation 2040, a seed volume is calculated based on the volume of seed added and the number of seeds counted. For example, the seed volume can be calculated by dividing the volume of seed added by the number of seeds counted Once the seed volume (e.g., seed size) is determined, then the number of seeds still in the seed meter will be known with the number of seeds being based on the sensitivity of the seed pool level sensor.

As described above, knowing the seed size and the number of seeds in the seed pool 520 allows for transitions between seed types as a boundary is approached to minimize blending of seeds across a boundary.

When the number of seeds required to reach a boundary is less than the number of seeds in seed pool 520, then a transition mode is started at operation 2050. Otherwise, when fill level sensor 570 indicates empty, additional seed is added to seed pool 520.

In the following example, there are 100 seeds in seed pool 520 when fill level sensor 570 indicates empty. For a transition between hybrids, a number of seeds passing seed sensor 150 is counted. When a number of seeds (e.g., 60 seeds pass seed sensor 150) in the seed pool reach a preset transition (e.g, 40 seeds), then there are approximately 40 seeds remaining in seed pool 520. At this point, actuator 950 is actuated to open the other compartment 932-2 or 932-1 to seed pool 520 to add the other variety of seed to seed pool 520. The selection of the number of seeds to remain in seed pool 520 is based on having a sufficient number of seeds to avoid having seed pool 520 be totally empty to avoid missed planting and minimizing the transition time between seed types.

The above process can be used with each seed type to calculate the size of each seed type. Calculations for a first seed type before switching to a second seed type can be used again when switching back to the first seed type.

In another embodiment, partial dumps can be used when approaching a boundary and where a full dump will exceed the boundary. A partial dump can be done by partially moving actuator 950 to a partial opening (less than a full opening) from the selected compartment 932-1 or 931-2. A partial opening is a partial communication between hopper 532/compartment 932 with opening 953 through seed passage 933. The partial opening, reduces the number of seeds entering the seed pool to minimize or eliminate seeds in the seed pool when the boundary is reached. The amount of the partial opening is directly proportional to the seed size. The larger the seed, the closer the partial opening is to full opening.

Seed size can be a known value that is used, which can be input by an operator, or seed size can be measured as described above. When measured as described above for each seed type, seed volume and seeds per dump can be calculated for each individual row, or seed volume and seeds per dump can be averaged across all rows.

Also, average distance traveled per dump can be calculated by obtaining the distance traveled by the planter 10 during the time between successive dumps and averaging the distances traveled per dump. The average can be based on a number of recent measurements, or the average can be based on a per hopper 532/compartment 932 basis.

Figure 16:
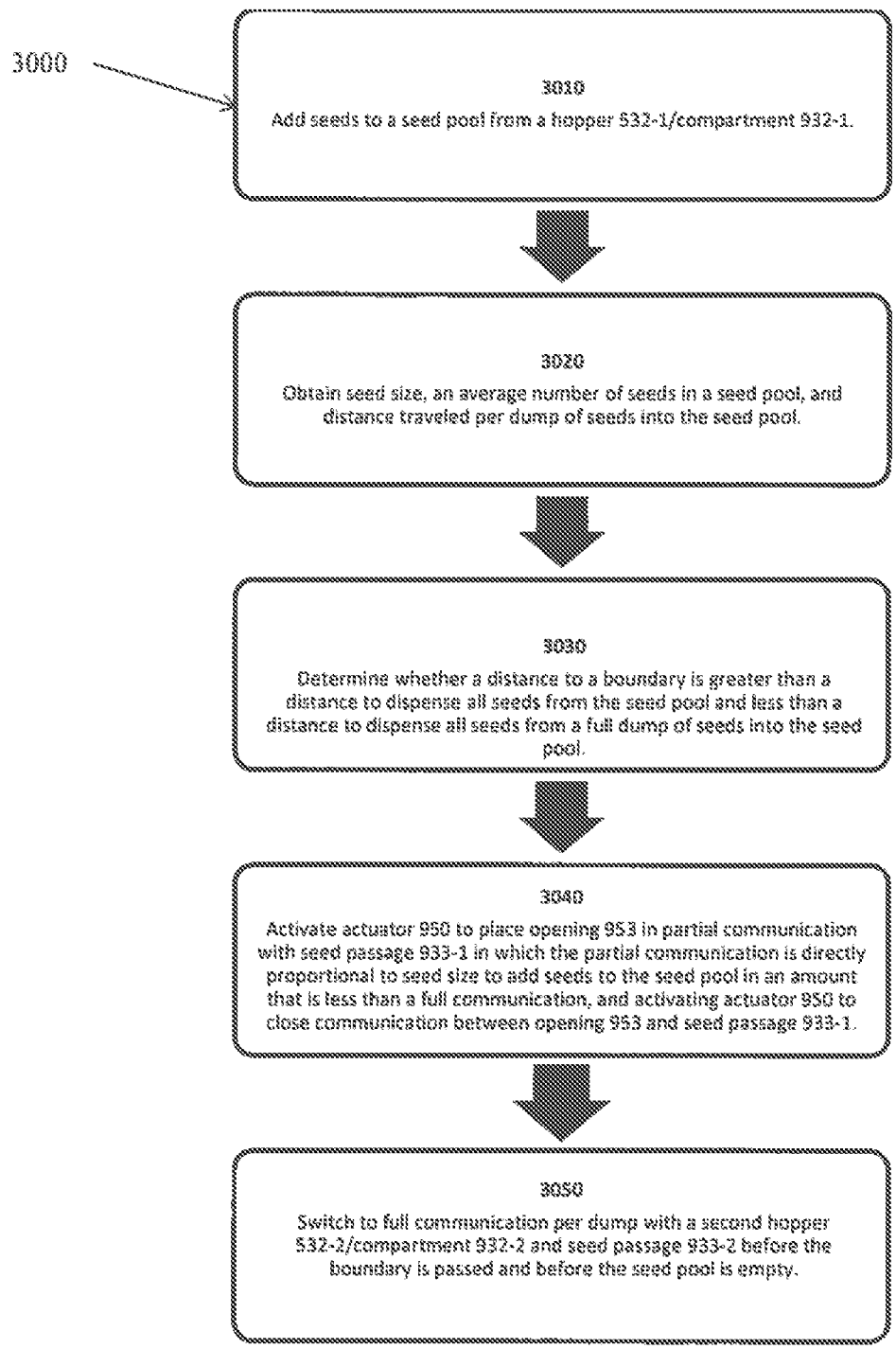
FIG. 16 illustrates a method for determining a partial dump of seeds in accordance with one embodiment.

Method 3000 of FIG. 16 is used to create a partial opening to minimize or eliminate the number of seeds in the seed pool at a boundary for a transition between hybrids. At operation 3010, seeds are added to a seed pool from a first hopper 532-1/compartment 932-1. At operation 3020, one or more of seed size, average number of seeds in a seed pool, and a distance traveled per dump of seeds into the seed pool are obtained. Each of these can be obtained as described above. At operation 3030, a determination is made whether a distance to a boundary is less than a distance to dispense all seeds from the seed pool. If operation 3030 is true (e.g., a distance to a boundary is less than a distance to dispense all seeds from the seed pool), then operation 3040 is performed to activate actuator 950 to place opening 953 in partial communication with seed passage 933-1 (partial opening) in which the partial communication is directly proportional to the seed size to add seeds to the seed pool in an amount that is less than a full communication (full opening) and activating actuator 950 to close communication between opening 953 and seed passage 9334. At operation 3050, switch to full communication per dump between a second hopper 532-2/compartment 932-2 and seed passage 9332 after the boundary is passed. If operation 3030 is false (e.g., distance to a boundary is not less than a distance to dispense all seeds from the seed pool), then previous operations of 3010, 3020, and 3030 can be repeated.

In one embodiment, actuator 950 can be operated by a stepper motor or a gear motor with an encoder. A minimum number of steps can be counted for moving opening 953 into communication with passage 933 so that seeds flow through passage 933. A maximum seeds per dump is based on the number of seeds based on the smallest size seed for the seed type (e.g., corn, soybean, sugar beet, cotton) to pass per dump. The number of steps for the partial opening is then calculated as:

minimum steps for opening+(scaling factor*(maximum seeds per dump current average seeds per dump)).

In one embodiment, the scaling factor can be 1/5.

Figure 18:
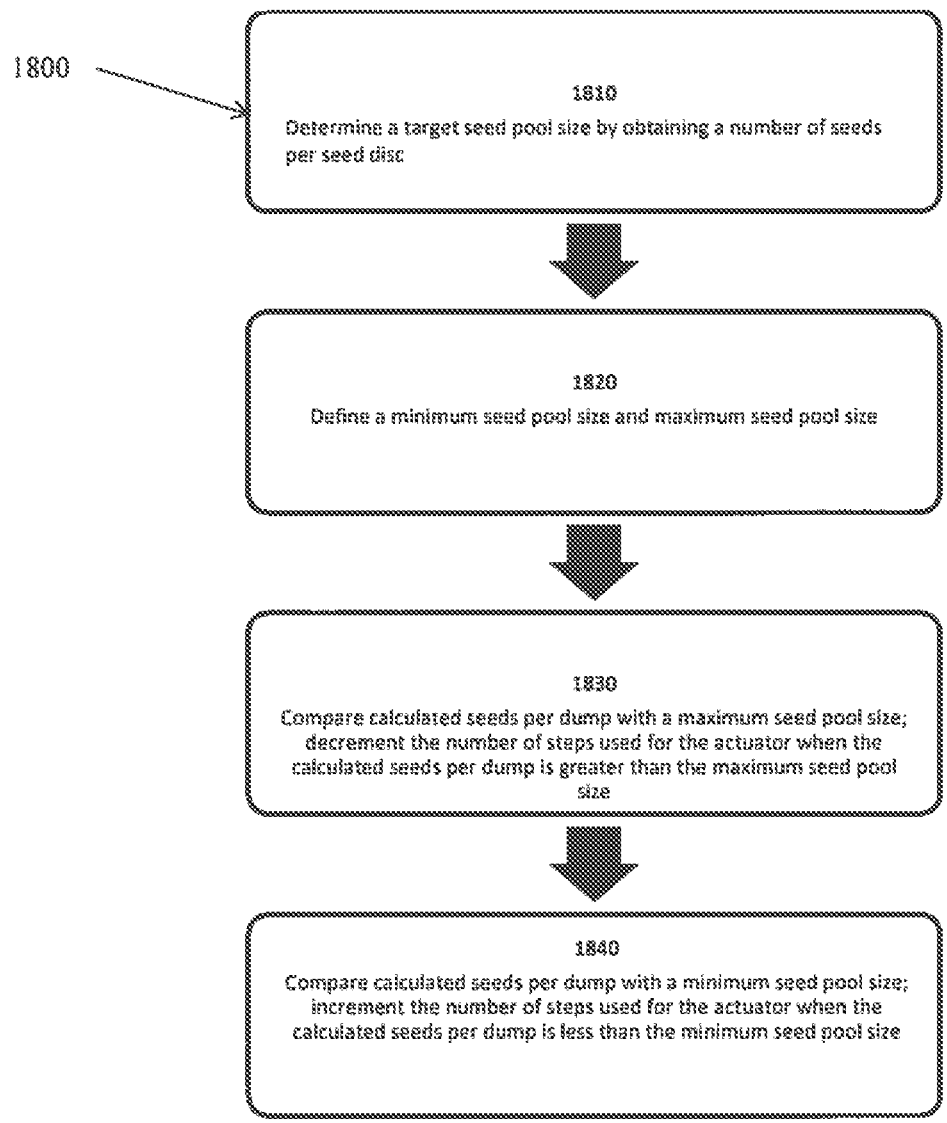
FIG. 18 illustrates a method for determining a partial dump of seeds in accordance with another embodiment.

The above method can be used with any seed type, such as corn, sugar beets, cotton, or soybeans, In another embodiment, the method for sugar beets can be modified as illustrated in FIG. 18. At operation 1810, a target seed pool size is determined by obtaining a number of seeds per seed disc 320 from an operator based on the seed disc 320 used. Factors are used to define a minimum seed pool size and maximum seed pool size at operation 1820. In one embodiment, minimum seed pool size is 5*seeds per disc, and mximum seed pool size is 6*seeds per disc, if the calculated seeds per dump is greater than the maximum seed pool size, then then number of steps used for actuator 953 (stepper motor or gear motor with encoder) is decreased by one step at operation 1830. If the calculated seeds per dump is less than the minimum seed pool size, then the number of steps used for actuator 953 is increased by one step at operation 1840. This can be done for each dump, or when a set number of dumps is greater than the maximum or less than the minimum. In one embodiment, the number of steps can be changed when three out of ten dumps is above the maximum or below the minimum.

While the above methods change the area of the opening per dump, which is based on a fixed time for opening, the time for opening can be changed while using a full opening (fixed area) to obtain the same number of seeds per dump. In one embodiment, this alternative can be used for soybeans as described below.

Average seeds per dump and average distance traveled per dump are obtained as described above. Distance to the boundary is determined as above. A target distance per dump is defined as a distance to dispense all seeds from a seed pool over a given distance at a given speed. This can be determined by empirical testing. The average distance per dump is compared to the target distance per dump. If the average distance per dump is less than the target distance per dump, then the amount of time that actuator 953 is activated to place opening 953 in communication with passage 933 is increased. If the average distance per dump is greater than the target distance per dump, then the amount of time that actuator 953 is activated to place opening 953 in communication with passage 933 is decreased. The increments for increasing or decreasing time can be done in fixed amounts, such as 10 ms per change. The total time can have a minimum amount of time and a maximum amount of time, in one embodiment, the amount of time can be 100 ms to 800 ms. Time can be incremented and decremented by the fixed amount over the time range. These calculations can be done for each dump, or when a set number of dumps is greater than the maximum or less than the minimum. In one embodiment, the number of steps can be changed when three out of ten dumps is above the maximum or below the minimum.

Figure 17:
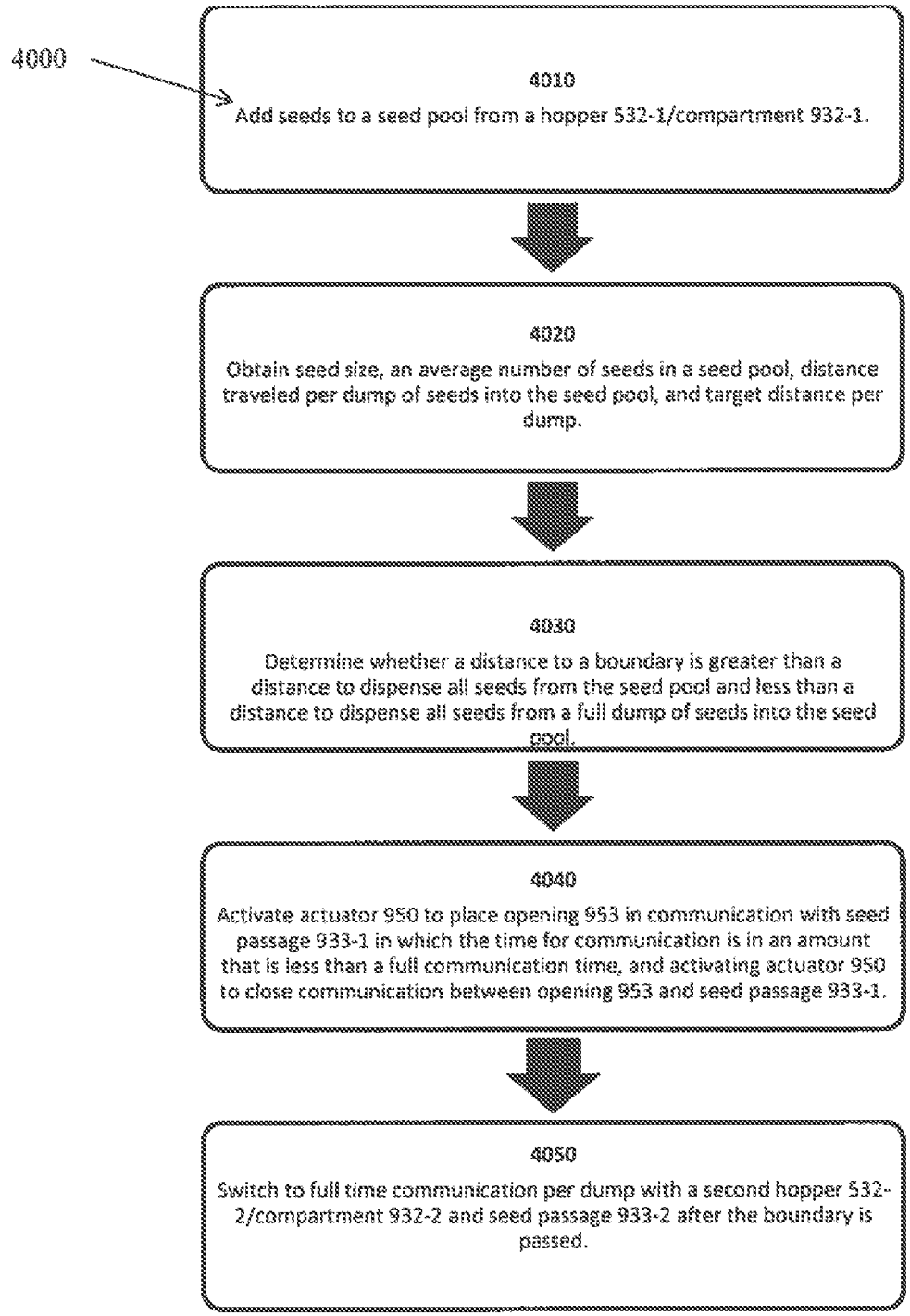
FIG. 17 illustrates a method for determining a partial dump of seeds in accordance with one embodiment.

Method 4000 of FIG. 17 illustrates using variable time with fixed opening to minimize or eliminate the number of seeds in the seed pool at a boundary. At operation 4010, seeds are added to a seed pool from a first hopper 532-1/compartment 932-1. At operation 4020, seed size, average number of seeds in a seed pool, a distance traveled per dump of seeds into the seed pool, and target distance per dump are obtained. Each of these can be obtained as described above. At operation 4030, a determination is made whether a distance to a boundary is greater than a distance to dispense all seeds from the seed pool and. less than a distance to dispense all seeds from a full dump. If operation 4030 is true (e.g., a distance to a boundary is greater than a distance to dispense all seeds from the seed pool and less than a distance to dispense all seeds from a full dump), then operation 4040 is performed to activate actuator 950 to place opening 953 in communication with seed passage 933-1 in which the time for communication is an amount that is less than a full communication time and activating actuator 950 to close communication between opening 953 and seed passage 933-1. A variable time for activating actuator 950 for placing opening in communication with seed passage can be adjusted based on comparing the average distance per dump to the target distance per dump as discussed above. At operation 4050, switch to full time communication per dump between a second hopper 532-2/compartment 932-2 and seed passage 933-2 after the boundary is passed. If operation 4030 is false (e.g., a distance to a boundary is greater than a distance to dispense all seeds from the seed pool and greater than a distance to dispense all seeds from a full dump), then previous operations of 4010, 4020, and 4030 can be repeated.

While illustrated with variable geometry with fixed time or with variable time with fixed geometry, in another embodiment, variable time and variable geometry can be used in combination.

What is claimed is:

1. A method of minimizing or eliminating seeds in a seed pool when crossing a boundary during planting comprising:
   adding seeds to the seed pool from a first compartment;
   obtaining one or more of seed size of the seeds, an average number of seeds in the seed pool, a maximum number of seeds in the seed pool, and a distance traveled per dump of seeds into the seed pool;
   determining whether a distance to the boundary is greater than a distance to dispense all seeds from the seed pool and less than a distance to dispense all seeds from a full dump of seeds into the seed pool;
   activating an actuator to partially open a passageway between the first compartment and the seed pool in which the partially open passageway is directly proportional to seed size to create a partial dump; and
   activating the actuator to close the passageway after the partial dump.

2. The method of claim 1, wherein the actuator is activated to partially open a passageway between the first compartment and the seed pool when the distance to the boundary is greater than a distance to dispense all seeds from the seed pool and less than a distance to dispense all seeds from a full dump of seeds into the seed pool.

3. The method of claim 2 wherein the first compartment receives a first seed variety and the second compartment receives a second seed variety.

4. The method of claim 1 further comprising:
   adding seeds to the seed pool from a second compartment before the boundary is passed and before the seed pool is empty.

5. The method of claim 4 wherein the first and second compartments are formed within a hopper.

6. The method of claim 4 wherein the first compartment is a first auxiliary hopper and the second compartment is a second auxiliary hopper of a row unit.

7. The method of claim 1 wherein the actuator is operated by a stepper motor or gear motor with encoder and a number of steps is counted for the partially opened passageway so that seeds flow through the partially opened passageway.

8. The method of claim 7, further comprising:
   determining the number of steps for the partially opened passageway based on a maximum seeds per dump, minimum steps for opening the passageway, a scaling factor, and a current average seeds per dump.

9. The method of claim 7 further comprising:
   comparing calculated seeds per dump with a maximum seed pool size; and
   decrementing the number of steps used for the actuator when the calculated seeds per dump is greater than the maximum seed pool size.

10. The method of claim 7 further comprising:
    comparing calculated seeds per dump with a minimum seed pool size; and
    incrementing the number of steps used for the actuator when the calculated seeds per dump is less than the minimum seed pool size.

11. The method of claim 1 wherein the seeds comprise corn seeds, sugar beet seeds, cotton, or soybean seeds.

12. A method of minimizing or eliminating seeds in a seed pool when crossing a boundary during planting comprising:
    adding seeds to the seed pool from a first compartment;
    obtaining an average number of seeds in the seed pool, a distance traveled per dump of seeds into the seed pool, and a target distance per dump;
    determining whether a distance to the boundary is greater than a distance to dispense all seeds from the seed pool and less than a distance to dispense all seeds from a full dump of seeds into the seed pool;
    activating an actuator to open a passageway between the first compartment and the seed pool in which a time for opening is less than a full communication time; and
    activating the actuator to close the passageway after the dump.

13. The method of claim 12, wherein the actuator is activated to open a passageway between the first compartment and the seed pool when the distance to the boundary is greater than a distance to dispense all seeds from the seed pool and less than a distance to dispense all seeds from a full dump of seeds into the seed pool.

14. The method of claim 12 further comprising:
    adding seeds to the seed pool from a second compartment before the boundary is passed and before the seed pool is empty.

15. The method of claim 14 wherein the first and second compartments are formed within a hopper.

16. The method of claim 14 wherein the first compartment is a first auxiliary hopper and the second compartment is a second auxiliary hopper of a row unit.

17. The method of claim 14 wherein the first compartment receives a first seed variety and the second compartment receives a second seed variety.

18. The method of claim 14, further comprising:
decreasing the time for activating the actuator to open a passageway when the average distance per dump is greater than the target distance per dump.

19. The method of claim 12 wherein the actuator is operated by a stepper motor or gear motor with encoder.

20. The method of claim 12, further comprising:
comparing average distance per dump to the target distance per dump; and
increasing the time for activating the actuator to open a passageway when the average distance per dump is less than the target distance per dump.

21. The method of claim 12 wherein the seeds comprise soybean seeds.

22. A seed variety system, comprising:
a seed pool for dispensing seed during planting operations; and
processing logic to perform operations including
adding seeds to the seed pool from a first compartment,
obtaining one or more of seed size of the seeds, an average number of seeds in the seed pool, a maximum number of seeds in the seed pool, and a distance traveled per dump of seeds into the seed pool,
determining whether a distance to the boundary is greater than a distance to dispense all seeds from the seed pool and less than a distance to dispense all seeds from a full dump of seeds into the seed pool,
activating an actuator to partially open a passageway between the first compartment and the seed pool in which the partially open passageway is directly proportional to seed size to create a partial dump, and
activating the actuator to close the passageway after the partial dump.

23. The seed variety system of claim 22, wherein the actuator is activated to partially open a passageway between the first compartment and the seed pool when the distance to the boundary is greater than a distance to dispense all seeds from the seed pool and less than a distance to dispense all seeds from a full dump of seeds into the seed pool.

24. The seed variety system of claim 22 wherein the processing logic to perform operations further including adding seeds to the seed pool from a second compartment after the boundary is passed.

* * * * *